United States Patent [19]

Kebo

[11] Patent Number: 4,804,258
[45] Date of Patent: Feb. 14, 1989

[54] FOUR MIRROR AFOCAL WIDE FIELD OF VIEW OPTICAL SYSTEM

[75] Inventor: Reynold S. Kebo, Los Angeles, Calif.

[73] Assignee: Hughes Aircraft Company, Los Angeles, Calif.

[21] Appl. No.: 859,297

[22] Filed: May 5, 1986

[51] Int. Cl.[4] .................. G02B 17/06; G02B 23/06
[52] U.S. Cl. .................................................. 350/505
[58] Field of Search .................. 350/505, 442–444, 350/620

[56] References Cited

U.S. PATENT DOCUMENTS 4,226,501 10/1980 Shafer .................................. 350/505
4,265,510 5/1981 Cook .................................... 350/505

OTHER PUBLICATIONS

Gelles, R., "Unobscured Aperture Stigmatic Telescopes", Optical Engineering, 11/12-1974, pp. 534–538.
Korsch, D., "Design and Optimization Technique for Three-Mirror Telescopes", App. Optics, 11-1-80, pp. 3640–3645.

Primary Examiner—William H. Punter
Attorney, Agent, or Firm—Ronald L. Taylor; W. J. Streeter; A. W. Karambelas

[57] ABSTRACT

A four mirror afocal optical system is disclosed. The primary mirror (12), secondary mirror (14), tertiary mirror (16), and quaternary mirror (18) form an afocal reimaging optical system which is off axis in both aperture and field angle. The secondary, tertiary and quaternary mirrors are tilted and decentered relative to the optical axis of the primary mirror to enhance image quality and to provide access to a real exit pupil.

30 Claims, 1 Drawing Sheet

FOUR MIRROR AFOCAL WIDE FIELD OF VIEW OPTICAL SYSTEM

BACKGROUND OF THE INVENTION

1. Field of the Invention

The present invention relates to an afocal wide field of view optical system and more particularly to a system having four non-spherical mirrors.

2. Description of Related Art

Wide field of view optical systems, such as reflective, afocal telescopes are utilized in multispectral applications and in certain space sensor systems. The use of these wide field of view optical systems is to provide larger unobscured two dimensional field of view ranges by the system. The image space field of view may be viewed at the exit pupil by various types of sensors which consist of an imaging optical system and a detector array. This information may be separated by dichroic beamsplitters and used by several sensors or refractive imaging optics with detector arrays operating in different spectral bands of interest. The most familiar type of sensor would be the human eye which has a single lens imaging system and a light sensitive retina, which translates light energy into nervous energy.

Prior wide field of view reflective optical systems include afocal telescopes having two confocal paraboloidal mirrors and three mirror anastigmat design. Both types of telescopes have several disadvantages. The two mirror design suffers from field curvature aberrations. As the magnification ratios increase in the systems from 1.3× to 4.0×, the curvature of the secondary mirror increases thus increasing the telescopes field curvature aberrations. These uncorrected field curvature aberrations severely limit the usefulness of these two mirror designs beyond about 3 degrees at a 4× magnification ratio. The three mirror design provides a useable object space field of view coverage of approximately 5 degrees circular field of view beyond which field aberrations, such as coma and astigmatism, severely degrade optical performance. Thus, there is a need in the art to provide an all reflective telescope having a wide field of view (greater than 5 degrees, circular) at a 4× magnification which enables multi-spectral operation with sensors or refractive imagers to be achieved.

SUMMARY OF THE INVENTION

Accordingly, it is an object of the present invention to overcome the disadvantages of the above cited art. The new and improved four mirror optical system of the present invention provides the art with a two dimensional circular field of view of about 10 degrees or greater and also a rectangular field of view of about 10 degrees by 15 degrees for all multispectral applications. Also, the present invention provides the art with a four non-spherical mirror system which is off axis in aperture and is offset in field of view angle.

The new and improved afocal optical system of the present invention provides the art with a four mirror reflective telescope. The afocal optical system includes a primary mirror having a non-spherical reflective surface and having the mirror defining an optical axis. A secondary mirror, having a non-spherical reflective surface, is tilted and decentered with respect to the optical axis. A tertiary mirror, having a non-spherical reflective surface, is tilted and decentered with respect to the optical axis. Also, the system includes a quaternary mirror, having a non-spherical reflective surface, tilted and decentered with respect to the optical axis. The non-spherical surfaces of the primary, secondary, tertiary and quaternary mirrors and their exact orientation with respect to each other produce an afocal configuration which has its focus at infinity. The system is off axis in aperture and field of view which determine the positions of the primary mirror and the exit pupil with respect to each other.

The system generally includes a field stop position between the tertiary and quaternary mirrors. Also, the system generally includes an entrance pupil which is positioned in front of the primary mirror. The system's primary, tertiary, and quaternary mirrors are generally positive power mirrors, and the secondary mirror is generally a negative power mirror balancing the primary, tertiary, and quaternary mirrors for providing the system with a flat field of view condition at the exit pupil.

From the subsequent description and the appended claims taken in conjunction with the accompanying drawings, other objects and advantages of the present invention will become apparent to one skilled in the art.

DESCRIPTION OF THE PREFERRED EMBODIMENT

Figure 1:
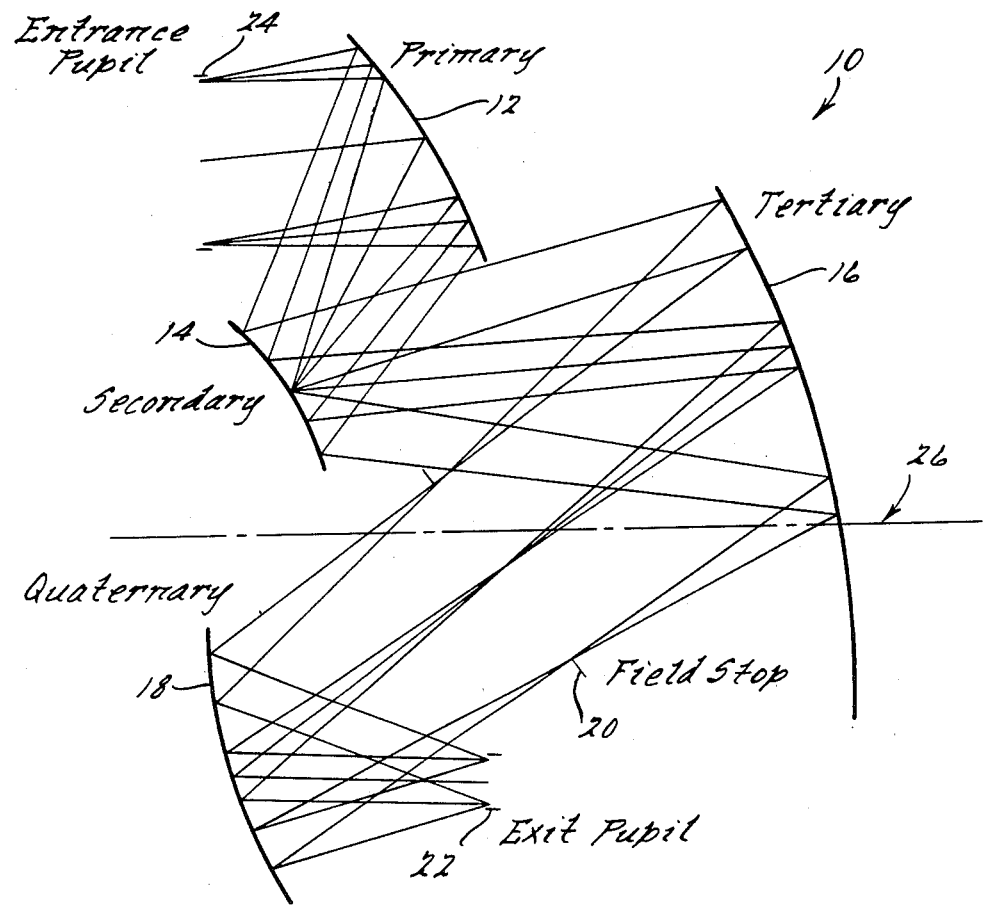
FIG. 1 is a side elevational schematic of an afocal optical system in accordance with the present invention.
Figure 2:
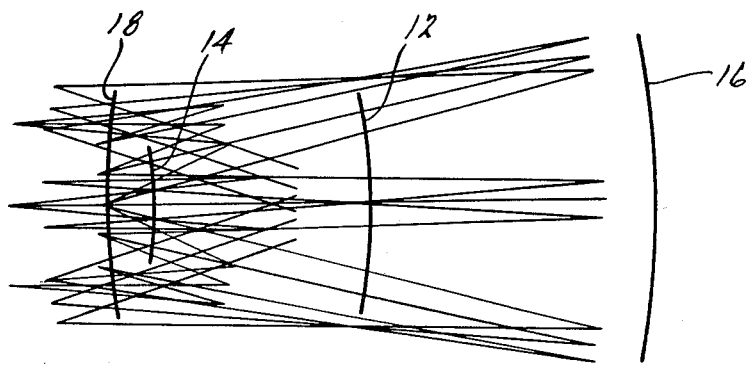
FIG. 2 is a plane view thereof.

Turning to FIGS. 1 and 2, a four mirror afocal optical system is illustrated and is designated with reference numeral (10). The system is a relayed, reimaging afocal optical system including four non-spherical mirrors. The system (10) includes a primary mirror (12), which is a conic ellipsoid mirror, reflecting into a secondary mirror (14), which is a conic hyperboloid mirror. The secondary mirror (14) reflects into a tertiary mirror (16), which is a conic hyperboloid mirror, which, in turn, reflects into a quaternary mirror (18), which is a conic oblate spheroid mirror. The primary mirror (12), secondary mirror (14), and tertiary mirror (16) constitute an objective forming an intermediate image at which point a field stop (20) is positioned. This intermediate image is focused at infinity by the quaternary mirror (18) which directs the collimated beam through the exit pupil (22).

An entrance pupil (24) is positioned out in front of the ellipsoid primary mirror (12) which determines the optical axis (26) which, in turn, defines the system center line. Also, an aperture stop may be positioned at the entrance pupil (24). The field stop (20) at the intermediate image position allows the system to be shielded from unwanted out-of-field radiation. The system is configured to be off axis in both aperture and field to produce or determine the positions of the reflective surface of the primary mirror (12) and the exit pupil (22). Neither the entrance pupil (24) nor the field stop (20) is centered on the optical axis (26). The field of view can either be a circular field of view or a rectangular field of view. When a circular field of view is used, the diameter of the field of view is generally around 10°. When a rectangular field of view is utilized, the field of view extends from a +5.0° to −5.0° in a vertical direction and from +7.5° to about −7.5° in a horizontal direction in the rectangular embodiment. The unique geometry of the optical system lends itself to such fields of view. However, the system may work as well in other formats. A circular entrance pupil is selected for the 10° field of view embodiment and a rectangular entrance pupil is selected for the 10° to 15° field of view embodiment.

The center of the field of view is offset at an angle of +5° from the optical axis of the primary mirror (12). The primary, tertiary, and quaternary mirrors are positive mirrors and the secondary mirror is a negative mirror. The power of the three positive mirrors is balanced by the negative power of the secondary mirror to provide a zero Petzval curvature or a flat field condition. The secondary, tertiary and quaternary mirrors are tilted and decentered to improve the optical performance of the system. The titling and decentering of the mirrors corrects field aberrations and produces a real accessible exit pupil (22). The primary, secondary, and tertiary mirror from the objective and the positive quaternary mirror forms a reflective "eye piece" of the system, which recollimates the beam to focus at infinity. This type of system, with the entrance pupil (24) out in front of the primary mirror, forms a real exit pupil (22).

The following lists the optical characteristics of the system. The design has been scaled to unit entrance pupil diameter. The decentered entrance pupil (24) is positioned in front of the primary mirror (12), and the object space field of view is essentially a 10° circle or a 10° by 15° rectangle. The primary, secondary, and tertiary mirrors (12), (14) and (16) forms an image at the field stop (20). The intermediate image is focused at infinity by the quaternary mirror (18), which directs the collimated beam through the exit pupil (22). The exit pupil (22) is the projected image of the entrance pupil (24). The use of the form with an off-axis entrance pupil and with an offset field angle, yields an unobscured telescope with an accessible exit pupil.

A specific prescription for the 10° circular two dimensional field of view system is given in the following table:

TABLE 1

|  | Description | Radius | CC | Thickness | Tilt | Decenter |
|---|---|---|---|---|---|---|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |

Field of View
Offset Angle = +5 Degrees
Entrance Pupil Dia = 1.0 Inch, Circular
Field of View = 10 Degrees, Circular
Magnification Ratio = 4×

(+) Distance are to the right along primary mirror optical axis
(+) Radii have centers to the right
(+) Decenters are up
(+) Tilts are counterclockwise, degrees
CC Conic Constant = -(Eccentricity)$^2$
Decenters are done before tilting
Thicknesses are between mirror vertices before decenters and tilts are applied.
All dimensions are in inches unless specified otherwise.

A prescription for a second embodiment of the system yielding a rectangular two dimensional field of view having a 10° by 15° rectangular field of view is given in the following table:

TABLE 2

|  | Description | Radius | CC | Thickness | Tilt | Decenter |
|---|---|---|---|---|---|---|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |

Field of View
Offset Angle = +5 Degrees
Entrance Pupil Dia = 1.0 × .75 Inch, Rectangular Pupil Shape
(Elevation of Azimuth)
Field of View = 10 × 15 Degrees, Rectangular
Magnification Ratio = 4×

(+) Distance are to the right along primary mirror optical axis
(+) Radii have centers to the right
(+) Decenters are up
(+) Tilts are counterclockwise, degrees
CC Conic Constant = -(Eccentricity)$^2$
Decenters are done before tilting
Thicknesses are between mirror vertices before decenters and tilts are applied.
All dimensions are in inches unless specified otherwise.

Advantages provided by the system which are examples of the preferred embodiment of this invention include the simplicity in that the mirrors are conic. The field of view is increased over that of three mirror and two mirror systems by almost double to triple the field of view seen by these particular types of mirror systems.

Specific utility with the four mirror afocal optical system of this invention includes the system where a scanning sensor is placed at the exit pupil to convert the image space field of view into electronic signals. The scanning sensor would be placed at the exit pupil in line with the collimated beam so that if a field of view is scanned by the sensor's optical system, the image scene can be sensed by a plurality of detectors positioned at the image plane of the imaging optics, so that reconstruction of the scene is possible. This invention would apply equally well to a staring sensor with a two dimensional array of detectors.

While it will be apparent that the preferred embodiment is well calculated to fill the above stated objects, it will also be appreciated that the present invention is susceptible to modification, variation, alteration and change without varying from the scope and spirit of the present invention.

What is claimed is:

1. An afocal optical system comprising:
   a primary mirror defining an optical axis, said primary mirror having a non-spherical reflective surface;
   a secondary mirror having a non-spherical reflective surface which is tilted and decentered with respect to said optical axis;
   a tertiary mirror having a non-spherical reflective surface which is tilted and decentered with respect to said optical axis;
   a quaternary mirror having a non-spherical reflective surface which is tilted and decentered with respect to said optical axis;
   said primary, secondary, tertiary, and quaternary mirrors having surfaces shaped to create a focus at infinity and reflect through an exit pupil, said exit pupil providing the system with a field area of view greater than a 5 degree circle;
   said system being off axis in aperture and field to produce said positions of said reflective surface of said primary mirror and said exit pupil.

2. The system according to claim 1 wherein at least one of said mirrors is a negative reflective mirror.

3. The system according to claim 1 wherein a field stop is positioned between said tertiary and quaternary mirrors.

4. The system according to claim 1 wherein the entrance pupil for said optical system is positioned in front of said primary mirror.

5. An afocal wide field of view optical system comprising:
   a primary mirror defining an optical axis, said primary mirror having a conic ellipsoid reflective surface on one side of said optical axis;
   a secondary mirror having a conic hyperboloid reflective surface which is tilted and decentered with respect to said optical axis;
   a tertiary mirror having a conic hyperboloid reflective surface which is tilted and decentered with respect to said optical axis;
   a quaternary mirror having a conic oblate spheroid reflective surface which is tilted and decentered with respect to said optical axis;
   said primary, secondary, tertiary, and quaternary mirrors having surfaces shaped to create a focus at infinity and reflect through an exit pupil;
   said optical system being off axis in aperture and field to determine said positions of said primary mirror and said exit pupil.

6. The optical system according to claim 5 wherein a field stop is positioned between said tertiary and quaternary mirrors.

7. The optical system according to claim 5 wherein a collimated beam is projected as said exit pupil.

8. The optical system according to claim 7 wherein a field stop is positioned between said tertiary and quaternary mirrors.

9. The optical system according to claim 8 wherein the entrance pupil for said optical system is positioned in front of said primary mirror.

10. The optical system according to claim 5 wherein said primary, tertiary and quaternary mirrors are positive power mirrors and said secondary mirror is a negative power mirror wherein said secondary mirror power balances said primary, tertiary, and quaternary mirrors power providing the system with a flat field condition at the exit pupil.

11. The optical system according to claim 5 wherein said primary mirror being at a +5° offset field of view angle.

12. The optical system according to claim 5 wherein the entrance pupil for said optical system is positioned in front of said primary mirror.

13. The optical system according to claim 5 wherein said system has a circular field of view over about 10°.

14. The optical system according to claim 9 wherein said system has a circular field of view over about 10°.

15. The optical system according to claim 14 wherein the system having a 10° circular field of view has the following parameters:

|      | Description | Radius | CC | Thickness | Tilt | Decenter |
|------|-------------|--------|-----|-----------|------|----------|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |
|      | Field of View |  |  |  |  |  |
|      | Offset Angle = +5 Degrees |  |  |  |  |  |
|      | Entrance Pupil Dia = 1.0 Inch, Circular |  |  |  |  |  |
|      | Field of View = 10 Degrees, Circular |  |  |  |  |  |
|      | Magnification Ratio = 4× |  |  |  |  |  |

(+) Distance are to the right along primary mirror optical axis
(+) Radii have centers to the right
(+) Decenters are up
(+) Tilts are counterclockwise, degrees
CC Conic Constant = -(Eccentricity)$^2$
Decenters are done before tilting
Thicknesses are between mirror vertices before decenters and tilts are applied.
All dimensions are in inches unless specified otherwise.

16. The optical system according to claim 5 wherein said system has a rectangular field of view of about 10° by 15°.

17. The optical system according to claim 9 wherein said system has a rectangular field of view of about 10° to 15°.

18. The optical system according to claim 17 wherein said system having a 10° by 15° rectangular field of view has the following parameters:

|  | Description | Radius | CC | Thickness | Tilt | Decenter |
|---|---|---|---|---|---|---|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |

Field of View
Offset Angle = +5 Degrees
Entrance Pupil Dia = 1.0 × .75 Inch, Rectangular Pupil Shape (Elevation of Azimuth)
Field of View = 10 × 15 Degrees, Rectangular
Magnification Ratio = 4×

Distance are to the right along primary mirror optical axis
(+) Radii have centers to the right
(+) Decenters are up
(+) Tilts are counterclockwise, degrees
CC Conic Constant= -(Eccentricity)$^2$
Decenters are done before tilting
Thicknesses are between mirror vertices before decenters and tilts are applied.
All dimensions are in inches unless specified otherwise.

19. A four mirror afocal wide field of view optical system comprising:
a primary mirror defining an optical axis, said primary mirror having a conic ellipsoid reflective surface on one side of said optical axis;
an entrance pupil for said optical system positioned in front of said primary mirror;
a secondary mirror having a conic hyperboloid reflective surface which is tilted and decentered with respect to said optical axis;
a tertiary mirror having a conic hyperboloid reflective surface which is tilted and decentered with respect to said optical axis;
a quaternary mirror having a conic oblate spheroid reflective surface which is tilted and decentered with respect to said optical axis;
said primary, secondary, tertiary, and quaternary mirrors having surfaces shaped to create a focus at infinity and reflect through an exit pupil;
said exit pupil being on the other side of said optical axis from said reflective surface of said primary mirror;
said system being off axis in aperture and field to produce said positions of said reflective surface of said primary mirror and said exit pupil.

20. The optical system according to claim 19 wherein a field stop is positioned between said tertiary and quaternary mirrors.

21. The optical system according to claim 19 wherein a collimated beam is projected at said exit pupil.

22. The optical system according to claim 21 wherein a field stop is positioned between said tertiary and quaternary mirrors.

23. The optical system according to claim 19 wherein said primary, tertiary and quaternary mirrors are positive power mirrors and said secondary mirror is a negative power mirror wherein said secondary mirror power balances said primary, tertiary and quaternary mirrors power providing the system with a flat field condition at the exit pupil.

24. The optical system according to claim 19 wherein said primary mirror being at a +5° offset field of view angle.

25. The optical system according to claim 19 wherein said system has a circular field of view over about 10°.

26. The optical system according to claim 22 wherein said system has a circular field of view over about 10°.

27. The optical system according to claim 26 wherein the system having a 10° circular field of view has the following parameters:

|  | Description | Radius | CC | Thickness | Tilt | Decenter |
|---|---|---|---|---|---|---|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |

Field of View
Offset Angle = +5 Degrees
Entrance Pupil Dia = 1.0 Inch, Circular
Field of View = 10 Degrees, Circular
Magnification Ratio = 4×

(+) Distance are to the right along primary mirror optical axis
(+) Radii have centers to the right
(+) Decenters are up
(+) Tilts are counterclockwise, degrees
CC Conic Constant = -(Eccentricity)$^2$
Decenters are done before tilting
Thicknesses are between mirror vertices before decenters and tilts are applied.
All dimensions are in inches unless specified otherwise.

28. The optical system according to claim 19 wherein said system has a rectangular field of view of about 10° by 15°.

29. The optical system according to claim 22 wherein said system has a rectangular field of view of about 10° by 15°.

30. The optical system according to claim 29 wherein said system having a 10° by 15° rectangular field of view has the following parameters:

|  | Description | Radius | CC | Thickness | Tilt | Decenter |
|---|---|---|---|---|---|---|
| (12) | Primary Mirror | −4.10558 | −.91746 | −1.34369 | 0 | 0 |
| (14) | Secondary Mirror | −1.56908 | −1.0630 | 3.14859 | −1.4963 | −.01342 |
| (16) | Tertiary Mirror | −5.69096 | −1.3483 | −3.43660 | 7.9665 | .07929 |
| (18) | Quaternary Mirror | 4.58805 | .3252 | 1.19157 | 29.7497 | −2.16465 |
| (22) | Exit Pupil | INF | 0 | 0 | 0 | −1.3210 |
| (24) | Entrance Pupil | INF | 0 | 2.2500 | 0 | 2.500 |
|  | Field of View | | | | | |
|  | Offset Angle = +5 Degrees | | | | | |
|  | Entrance Pupil Dia = 1.0 × .75 Inch, Rectangular Pupil Shape | | | | | |
|  | (Elevation of Azimuth) | | | | | |
|  | Field of View = 10 × 15 Degrees, Rectangular | | | | | |
|  | Magnification Ratio = 4× | | | | | |

Distance are to the right along primary mirror optical axis
(+) Radii have centers to the right
(+) Decenters are up
(+) Tilts are counterclockwise, degrees
CC Conic Constant= -(Eccentricity)$^2$
Decenters are done before tilting
Thicknesses are between mirror vertices before decenters and tilts are applied.
All dimensions are in inches unless specified otherwise.

* * * * *